June 17, 1958
A. G. SETTEL
2,838,895
CUTTING MACHINE
Filed March 30, 1955
2 Sheets-Sheet 1
FIG I
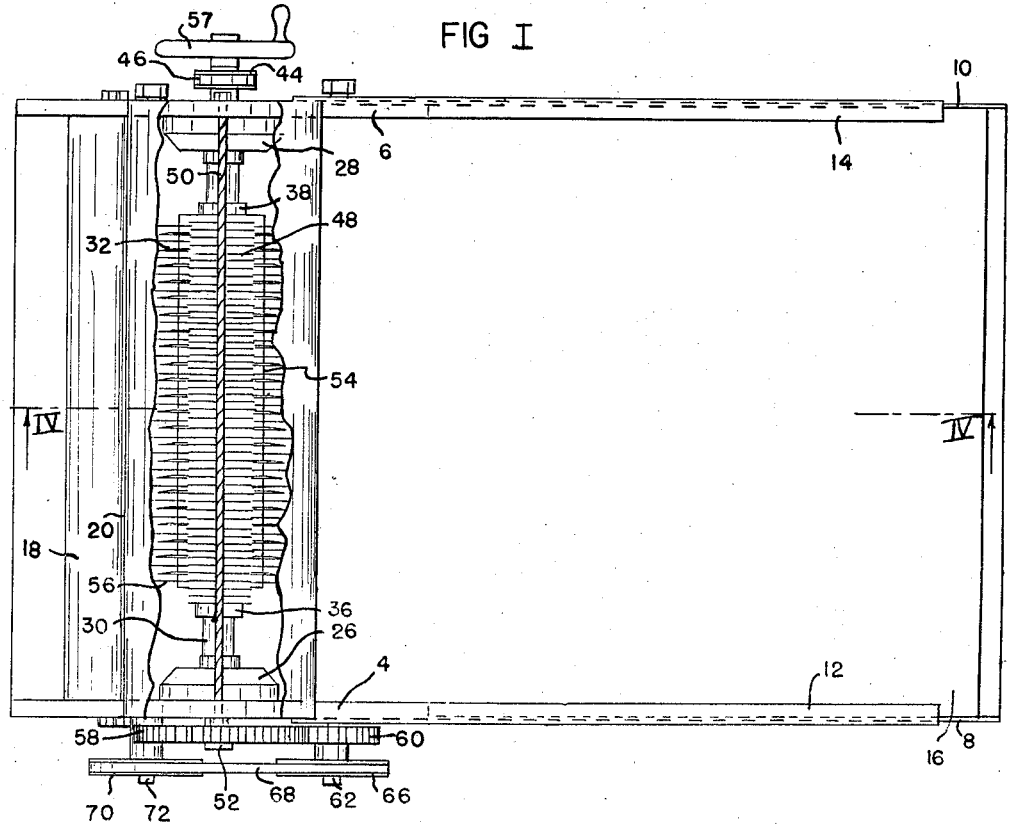
FIG II
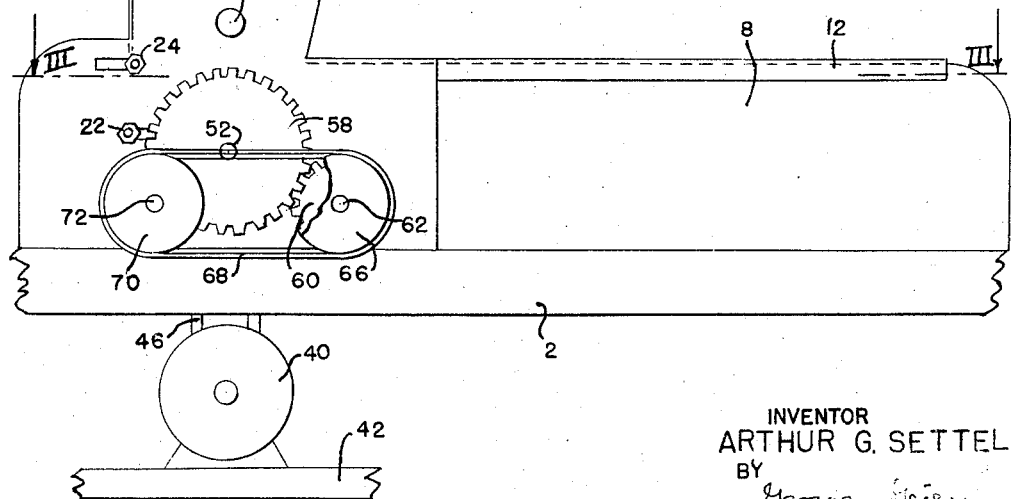
INVENTOR
ARTHUR G. SETTEL
BY
George Geier
AGENT June 17, 1958  A. G. SETTEL  2,838,895
CUTTING MACHINE
Filed March 30, 1955  2 Sheets-Sheet 2
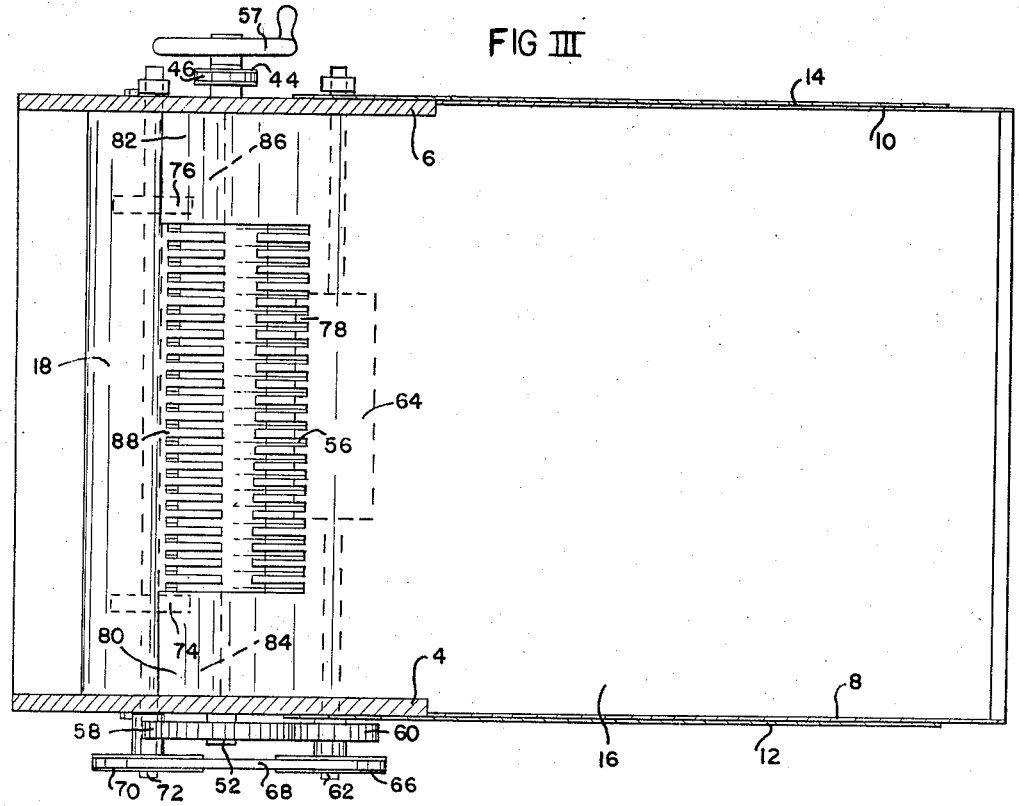
FIG III
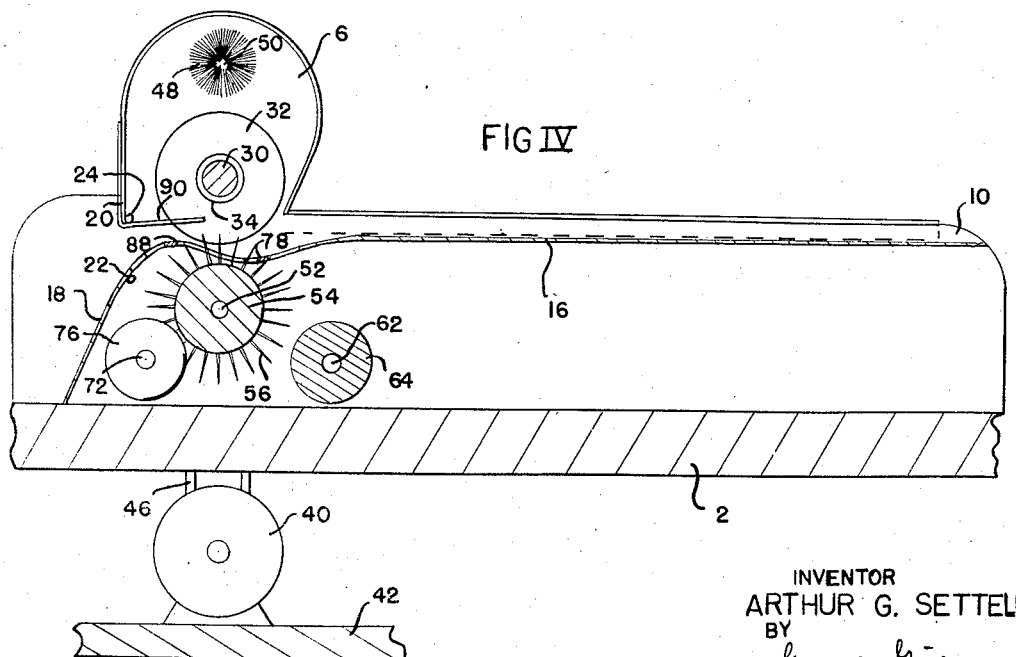
FIG IV
INVENTOR
ARTHUR G. SETTEL
BY
George Geier
AGENT

United States Patent Office 2,838,895
Patented June 17, 1958

2,838,895

CUTTING MACHINE

Arthur G. Settel, Bronx, N. Y.

Application March 30, 1955, Serial No. 498,017

9 Claims. (Cl. 53—111)

This invention relates to a machine for cutting fur bearing skins or pelts. In particular, the machine is useful for cutting skins into strips which can be sewed together to produce variations in the size and appearance of the finished skin and make them acceptable for incorporation into scarfs, capes, coats and other fur articles. This process is commonly known in the art as letting out the skin and as is known in the art the skin is usually first divided into halves and each half is cut into diagonal strips which may be 1/8, 3/16, 1/4, or 1/2 inch in width and these strips are sewn together after displacing each strip longitudinally. Variations in this process are known to those skilled in the art.

The cutting operation has been done by hand with a razor blade for a long time and it is still done in this manner to a large extent. It requires much skill to cut the strips evenly and without cutting any of the hair. My Patent No. 2,174,603, issued on October 3, 1939, describes a fur cutting machine which overcomes many of the disadvantages of the hand cutting operation and I have used machines of this type successfully for many years. However these machines are quite expensive to build and for this reason it has not been used by many of the small independent furriers who would otherwise have used it and benefited greatly thereby.

The most expensive part of these prior machines made according to my patent is the slot board which extends for almost the entire length of the machine and which must be provided with very accurately spaced slots running almost the entire length of the board. Furthermore these machines require considerable space because the slot board travels as the skin is cut making the space requirement equal to about twice the length of the slot board. In using these machines, the skin was laid on the slot board with the leather side down and a pin board was brought down against the skin so the pins would project through the hair of the fur and hold the skin against the slot board. The combination of skin, slot board and pin board was then moved over a series of cutting knives projecting upward through the slots in the slot board to cut the skin. It was then necessary to lift the cut strip of fur bearing skin off the slot board.

I have now developed a greatly simplified fur cutting machine which does not require the expensive slot board and which is more compact and easier and more convenient to operate. The means for obtaining these objects of my invention will be fully understood after reading the following description taken in conjunction with the accompanying drawings in which:

Fig. I is a view in plan of the machine with part of the housing broken away to show part of the internal construction.

Fig. II is a view in side elevation of the machine.

Fig. III is a view in sectional plan taken along the line III—III of Fig. II and looking in the direction of the arrows.

Fig. IV is a view in sectional elevation taken along the line IV—IV of Fig. I and looking in the direction of the arrows.

Referring to the drawings, the machine is shown resting on a support 2 which may be a table top or the like. The principal structural supports for the machine are the side plates 4 and 6 which may be cut from fairly heavy plate or the like and which have the shape shown including the generally rectangular lower portion and the rounded upper portion. The side plates 4 and 6 are extended by means of the side sheets 8 and 10 of sheet metal which may be welded to the side plates 4 and 6 or fastened thereto by other suitable means. The strips 12 and 14 of right angle cross-section provide structural reenforcement for the side sheets 8 and 10 and may also be welded thereto and to the side plates 4 and 6. The side plates 4 and 6 and the side sheets 8 and 10 are held apart by the shelf 16 and the guides 18 and 20, all of which are made of sheet metal and may be welded to the side plates and side sheets although in the case of the guides 18 and 20 the pressure of the side plates 4 and 6 will in itself be sufficient to hold the guides in place. The guides 18 and 20 are fastened to the rods 22 and 24 which act as additional supports for the guides. The ends of the rods 22 and 24 pass through slotted openings in the side plates 4 and 6 and are threaded to receive nuts as shown which help to hold the side plates 4 and 6 against the guides. The slotted openings permit adjustment of the guides 18 and 20 for optimum performance of the machine.

Bearings 26 and 28 are secured to the side plates 4 and 6 and support the shaft 30 for rotation. A plurality of circular cutting elements or rotary knives 32 are mounted for rotation about a common axis on the shaft 30. The cutting elements 32 are preferably as thin as razor blades and have cutting edges around the circumference which are as sharp as razor blades. The cutting elements 32 have central openings which fit over the shaft 30 and each cutting element is separated from the next by collars 34 see Fig. IV which also have central openings fitting over the shaft 30. The assembly of cutting elements and collars are held together by two wider outer collars 36 and 38 which are secured to the shaft 30 by set screws or the like. The number of cutting elements will depend upon the width of the cuts to be made whether 1/8, 3/16, 1/4 or 1/2 inch and the width of skin to be cut. In the working model of the machine 59 cutting elements are used for cutting 3/16" wide strips. This has been simplified in the drawing to show only 22 cutting elements.

In the case of the circular cutting elements 32 shown, means should be provided for driving the cutting elements around their common axis and this takes the form of the motor 40 mounted on a support 42 mounted below the base 2. The shaft 30 is provided with a pulley 44 secured thereto and and receiving the driving belt 46 driven by a similar pulley provided on the shaft of the motor 40. The direction of rotation is preferably clockwise as seen in the views of Figs. II and IV so that the cutting edge moves in the same direction as the skin.

I have found that these circular cutting elements may be sharpened in a very simple and convenient manner by merely providing a brush which may be brought into contact with the rotating blades and which exerts a stropping or honing action on them giving them a keen edge which is perfect for the intended purpose. It is not essential that the bristles of the brush be a material harder than the cutting elements and in fact I have found that synthetic fiber bristles such as nylon are very suitable. However, any type of bristle is suitable including glass fiber bristles.

The brush 48 shown is of the type in which the bristles are held between the twisted wire 50 which is supported through slotted openings in the side plates 4 and 6 as shown. If the wire 50 is held near the top ends of the slotted openings, the brush 48 does not engage the cutting elements 32. When the cutting elements 32 need sharpening the brush 48 is lowered in the slotted openings so that it will engage the cutting elements and sharpen them as they are rotated by the motor 40.

An axle 52 is mounted for rotation perpendicular to the cutting elements 32 between the sideplates 4 and 6 below the shaft 30. The axle 52 carries a cylinder 54 which rotates therewith. Holes are drilled radially in the cylinder 54 to receive pointed elements or pins 56. The pointed elements are preferably of the type which are cylindrical on one end to fit the holes in the cylinder and are of a reduced diameter at the other end tapering down to a fine point like a pin or a needle. The pointed elements 56 are equally spaced around the circumference of the cylinder 54 in planes which lie midway between the cutting elements 32 so that the pointed ends of the pins 56 pass between the cutting elements as the axle 52 is rotated. In the working model of the machine 24 pins are equally spaced in each of the planes as shown in the drawing and these are provided in 60 planes between and on both sides of each cutting element making a total of 1,440 pointed elements. In the drawing the number of planes is reduced to 23 to correspond to the number of cutting elements shown. In the embodiment shown, the pointed elements 56 and cylinder 54 are rotated in a counter clockwise direction in the view of Figs. II and IV by turning the handle 57. If desired the axle 52 may also be motor driven and this could be accomplished by means of suitable reduction gearing by the motor 40 but preferably the speed of rotation of the cylinder 54 is not as great as the speed of rotation of the cutting elements 32.

A gear 58 is carried on the axle 52 and engages a second gear 60 carried on an axle 62 which is mounted for rotation parallel to the axle 52 between the side plates 4 and 6. The axle 62 carries a roller 64 which rotates therewith. A pulley 66 shown partially cut away in Fig. II is carried on one end of the axle 62 and rotates therewith to drive the belt 68 which passes around a second pulley 70 to drive the axle 72 which carries the pulley 70. The axle 72 which is mounted parallel to the axles 52 and 62 for rotation between the sideplates 4 and 6 carries two short rollers 74 and 76 which are located beyond the pointed elements 56 so as not to interfere therewith.

The shelf 16 is bent downwardly as it approaches the pointed elements 56. A row of fingers 78 extend from the shelf 16 and pass between the planes of rotating pins. In the working model of the machine, 59 fingers are provided corresponding to the 59 cutting elements. In the drawing only 22 fingers are shown. Wide strips 80 and 82 (see Fig. III) extend from the shelf 16 beyond the pointed elements 56 and cover similar strips 84 and 86 extending from the guide 18.

The guide 18 is also provided with fingers 88 which pass between the planes of rotating pins; 59 of these fingers are provided in the working model and 22 are shown on the drawing.

The guide 20 mounted above the guide 18 is provided with fingers 90 which extend between the cutting elements 32; 59 of these fingers are provided in the working model and 22 are required in the embodiment shown. The guide 20 also extends beyond the end cutting elements over the strips 80 and 82.

In using the machine the fur bearing skin to be cut is laid with the hair side down on the shelf 16 at the proper angle for making the oblique cuts desired. One end of the skin is placed near the pins 56 and the hand wheel 57 is turned so that the pins penetrate the fur side of the skin and carry the leather side of the skin against the cutting elements which immediately cut it, the skin being stretched taut on the pins 56 as it approaches the cutting elements 32. The fingers 88 lift the cut strips of fur off the pins and carry them to the guide 18 which is inclined downward so that gravity will carry the cut strips down to the base 2. To assure proper functioning of the fingers 88, the tips of the pointed elements 56 should pass between the fingers 88 when making an angle of no more than 30 to 35° with the vertical. If the pins have already rotated to a more nearly horizontal position the fingers will not lift the strips of fur off properly. The fingers 90 prevent the cut strips of fur from being carried upward between the rotating cutting elements 32.

At the same time that the skin is placed on the shelf 16, a card is placed on the base 2 to be carried by the rollers 64, 74, and 76 under the guide 18 to receive the cut fur as it descends on the guide 18. The cut furs can be stored on these cards prior to sewing.

It is possible to reverse the positions of the cutting elements 32 and the cylinder 54, in which case the fur would be fed into the machine with the leather side down. However, the construction shown is preferred because the pins lift the fur off the fingers 78 so that there is no friction between these fingers and the fur as the fur is cut.

Having thus described the invention, what is claimed is:

1. A machine for cutting fur bearing skins comprising a plurality of cutting elements mounted parallel to each other, a plurality of pointed elements mounted around an axle and extending radially therefrom so that the ends thereof pass between said cutting elements as said axle is rotated, a shelf for guiding a fur bearing skin to the pointed elements so said skin will be carried by them to said cutting elements, said pointed elements being adapted to penetrate the hair and hold the leather side of the skin against said cutting elements and to carry the cut fur bearing skin past said cutting elements, the cutting edges of said cutting elements passing only between the pointed ends of said pointed elements so that only the leather of said fur bearing skin is cut by said cutting elements, and fingers on the opposite side of said cutting elements from said shelf adapted to disengage the cut fur bearing skin from said pointed elements and guide it out of the machine.

2. A machine for cutting fur bearing skins comprising a plurality of cutting elements parallel to each other, a plurality of pointed elements mounted around an axle and extending radially therefrom so that the ends thereof pass between said cutting elements as said axle is rotated, a shelf for guiding a fur bearing skin to the pointed elements so said skin will be carried by them to said cutting elements, said pointed elements being adapted to penetrate the hair and hold the leather side of the skin against said cutting elements and to carry the cut fur bearing skin past said cutting elements, the cutting edges of said cutting elements passing only between the pointed ends of said pointed elements so that only the leather of said fur bearing skin is cut by said cutting elements, fingers on the opposite side of said cutting elements from said shelf adapted to disengage the cut fur bearing skin from said pointed elements and guide it out of the machine and means extending between said cutting elements to guide the cut fur bearing skin away from said cutting elements and along said fingers.

3. A machine for cutting fur bearing skins comprising a plurality of circular cutting elements parallel to each other spaced on a common axis, means for rotating said circular cutting elements about said axis, a cylinder mounted for rotation about an axle perpendicular to said cutting elements, a plurality of pointed elements extending radially from said cylinder so that the ends thereof pass between said cutting elements as said axle is rotated, a shelf for receiving a fur bearing skin to be cut, fingers extending from said shelf between the ends of said pointed elements and guiding the fur bearing skin thereto so said skin will be carried thereby to said cutting elements, said pointed elements being adapted to penetrate the hair and hold the leather side of the skin against said cutting elements and to carry the cut fur bearing skin past said cutting elements, a guide provided with fingers extending between the ends of the pointed elements from the opposite side of said cutting elements to receive the cut fur bearing skin and a second guide provided with fingers extending between said cutting elements to guide the cut fur bearing skin away from said cutting elements and along said first guide.

4. A machine for cutting fur bearing skins comprising a plurality of circular cutting elements parallel to each other spaced on a common axis, means for rotating said circular cutting elements about said axis, a cylinder mounted for rotation about an axle perpendicular to said cutting elements and directly below the axis of rotation of said cutting elements, a plurality of pointed elements extending radially from said cylinder so that the ends thereof pass between said cutting elements as said axle is rotated, said pointed elements being arranged on said cylinder equally spaced around the circumference of said cylinder in planes being midway between said cutting elements, a horizontal shelf extending generally toward the region between said cutting elements and said cylinder for receiving a fur bearing skin to be cut, fingers extending from said shelf between the ends of said pointed elements in a slightly downward direction to guide the fur bearing skin thereto so said skin will be carried thereby to said cutting elements, said pointed elements being adapted to penetrate the hair and hold the leather side of the skin against said cutting elements and to carry the cut fur bearing skin past said cutting elements, a guide extending downward and away from said cutting elements provided with fingers extending downward between the ends of the pointed elements from the opposite side of said cutting elements to receive the cut fur bearing skin and a second guide above said first guide provided with fingers extending between said cutting elements to guide the cut fur bearing skin away from said cutting elements and along said first guide.

5. A machine for cutting fur bearing skins comprising a plurality of cutting elements mounted parallel to each other, a plurality of pointed elements mounted around an axle and extending radially therefrom so that the ends thereof pass between said cutting elements as said axle is rotated and a shelf for guiding a fur bearing skin to the pointed elements so said skin will be carried by them to said cutting elements, said pointed elements being adapted to penetrate the hair of said fur bearing skin and hold the leather side of the skin against said cutting elements and to carry the cut fur bearing skin past said cutting elements, the cutting elements passing only between the pointed ends of said pointed elements so that only the leather of said fur bearing skin is cut by said cutting elements, and means for projecting a card under the cut skin at the same rate as said skin to receive said cut skin.

6. A machine for cutting fur bearing skins comprising a plurality of circular cutting elements parallel to each other spaced on a common axis, means for rotating said circular cutting elements about said axis, a cylinder mounted for rotation about an axle perpendicular to said cutting elements and directly below the axis of rotation of said cutting elements, a plurality of pointed elements extending radially from said cylinder so that the ends thereof pass between said cutting elements as said axle is rotated, said pointed elements being arranged on said cylinder equally spaced around the circumference of said cylinder in planes being midway between said cutting elements, a horizontal shelf extending generally toward the region between said cutting elements and said cylinder for receiving a fur bearing skin to be cut, fingers extending from said shelf between the ends of said pointed elements in a slightly downward direction to guide the fur bearing skin thereto so said skin will be carried thereby to said cutting elements, said pointed elements being adapted to penetrate the hair and hold the leather side of the skin against said cutting elements and to carry the cut fur bearing skin past said cutting elements, a guide extending downward and away from said cutting elements provided with fingers extending downward between the ends of the pointed elements from the opposite side of said cutting elements to receive the cut fur bearing skin, a second guide above said first guide provided with fingers extending between said cutting elements to guide the cut fur bearing skin away from said cutting elements and along said first guide and a roller geared to the rotation of said cylinder for projecting a card under said guide at the same rate as said skin is projected out of the machine to receive said cut skin.

7. A machine for cutting fur bearing skins comprising a plurality of circular cutting elements mounted parallel to each other about a common axis, means for rotating said circular cutting elements about said axis, a plurality of pointed elements mounted around an axle and extending therefrom so that the ends thereof pass between said cutting elements as said axle is rotated and a shelf for guiding a fur bearing skin to the pointed elements so said skin will be carried by them to said cutting elements, means at the end of said shelf for assuring that said skin is brought into contact with said pointed elements, said pointed elements being adapted to penetrate the hair of said fur bearing skin and hold the leather side of the skin against said cutting elements and to carry the cut fur bearing skin past said cutting elements, the cutting edges of said cutting elements passing only between the pointed ends of said pointed elements so that only the leather of said fur bearing skin is cut by said cutting elements.

8. A machine for cutting fur bearing skins comprising a plurality of circular cutting elements parallel to each other spaced on a common axis, means for rotating said circular cutting elements about said axis, a cylinder mounted for rotation about an axle perpendicular to said cutting elements and directly below the axis of rotation of said cutting elements, a plurality of pointed elements extending radially from said cylinder so that the ends thereof pass between said cutting elements as said axle is rotated, said pointed elements being arranged on said cylinder equally spaced around the circumference of said cylinder in planes being midway between said cutting elements, a horizontal shelf extending generally toward the region between said cutting elements and said cylinder for receiving a fur bearing skin to be cut, means at the end of said shelf near the ends of said pointed elements to guide the fur bearing skin thereto so said skin will be carried thereby to said cutting elements, said pointed elements being adapted to penetrate the hair and hold the leather side of the skin against said cutting elements and to carry the cut fur bearing skin past said cutting elements, the cutting edges of said cutting elements passing only between the pointed ends of said pointed elements so that only the leather of said fur bearing skin is cut by said cutting elements, a guide extending downward and away from said cutting elements provided with fingers extending between the ends of the pointed elements from the opposite side of said cutting elements to receive the cut fur bearing skin, and a second guide above said first guide provided with means extending between said cutting elements to guide the cut fur bearing skin away from said cutting elements and along said first guide.

9. A machine for cutting fur bearing skins comprising a plurality of circular cutting elements parallel to each other spaced on a common axis, means for rotating said circular cutting elements about said axis, a cylinder mounted for rotation about an axle perpendicular to said cutting elements and directly below the axis of rotation of said cutting elements, a plurality of pointed elements extending radially from said cylinder so that the ends thereof pass between said cutting elements as said axle is rotated, said pointed elements being arranged on said cylinder equally spaced around the circumference of said cylinder in planes being midway between said cutting elements, a horizontal shelf extending generally toward the region between said cutting elements and said cylinder for receiving a fur bearing skin to be cut, means at the end of said shelf near the ends of said pointed elements to guide the fur bearing skin thereto so said skin will be carried thereby to said cutting elements, said pointed elements being adapted to penetrate the hair and hold the leather side of the skin against said cutting elements and to carry the cut fur bearing skin past said cutting elements, the cutting edges of said cutting elements passing only between the pointed ends of said pointed elements so that only the leather of said fur bearing skin is cut by said cutting elements, a guide extending downward and away from said cutting elements provided with fingers extending between the ends of the pointed elements from the opposite side of said cutting elements to receive the cut fur bearing skin, a second guide above said first guide provided with means extending between said cutting elements to guide the cut fur bearing skin away from said cutting elements and along said first guide, and a roller geared to the rotation of said cylinder for projecting a card under said guide at the same rate as said skin is projected out of the machine to receive said cut skin.

References Cited in the file of this patent

UNITED STATES PATENTS

| | | |
|---|---|---|
| 361,707 | Matheis | Apr. 26, 1887 |
| 1,200,136 | Richardson | Oct. 3, 1916 |
| 1,297,108 | Cunningham | Mar. 11, 1919 |
| 1,319,219 | Hickey | Oct. 21, 1919 |
| 1,390,612 | Hickey | Sept. 13, 1921 |
| 1,763,308 | Horn | June 10, 1930 |
| 1,826,517 | Klockner et al. | Oct. 6, 1931 |
| 2,020,136 | Crocella | Nov. 5, 1935 |
| 2,236,038 | Silberstang | Mar. 25, 1941 |
| 2,308,804 | Dager | Jan. 19, 1943 |
| 2,410,146 | Birch | Oct. 29, 1946 |
| 2,514,804 | Settel | July 11, 1950 |
| 2,605,920 | Hammel | Aug. 5, 1952 |
| 2,636,654 | Sykes | Apr. 28, 1953 |
| 2,661,801 | Littman | Dec. 8, 1953 |

FOREIGN PATENTS

| | | |
|---|---|---|
| 3,825 | Great Britain | of 1885 |